US006444077B1

(12) United States Patent
Fennessy

(10) Patent No.: US 6,444,077 B1
(45) Date of Patent: Sep. 3, 2002

(54) CONCRETE DISPLAY DEVICE AND METHOD OF MAKING

(75) Inventor: P. Michael Fennessy, Liverpool, NY (US)

(73) Assignee: Global Trade Enterprises, Ltd., Liverpool, NY (US)

( * ) Notice: Subject to any disclaimer, the term of this patent is extended or adjusted under 35 U.S.C. 154(b) by 0 days.

(21) Appl. No.: 09/563,887

(22) Filed: May 3, 2000

Related U.S. Application Data

(60) Provisional application No. 60/132,166, filed on May 3, 1999.

(51) Int. Cl.[7] ................................................ B32B 31/22

(52) U.S. Cl. ....................... 156/249; 156/248; 156/154; 156/250; 156/268; 156/281

(58) Field of Search ................................ 156/247, 249, 156/153, 154, 277, 278, 281, 257, 250, 248, 268; 427/272, 282, 287, 289

(56) References Cited

U.S. PATENT DOCUMENTS

| | | | | |
|---|---|---|---|---|
| 667,898 | A | * | 2/1901 | Wilcke |
| 2,410,472 | A | * | 11/1946 | Wartha |
| 2,752,732 | A | | 7/1956 | Walker |
| 3,463,653 | A | * | 8/1969 | Letter |
| 3,507,740 | A | * | 4/1970 | Gaspari |
| 3,579,926 | A | * | 5/1971 | Gaspari |
| 3,916,050 | A | * | 10/1975 | Kurhajec |
| 4,316,766 | A | * | 2/1982 | Levin et al. |
| 4,646,480 | A | | 3/1987 | Williams |
| 4,646,482 | A | | 3/1987 | Chitjian |
| 4,801,490 | A | * | 1/1989 | Schuette |
| 4,954,192 | A | * | 9/1990 | Dzziekan .................... 156/154 |
| 5,061,172 | A | | 10/1991 | Fennessy, Sr. |
| 5,124,182 | A | * | 6/1992 | Kubo et al. |
| 5,219,511 | A | | 6/1993 | Fennessy, Sr. |
| D338,817 | S | | 8/1993 | Fennessy, Sr. |
| 5,271,690 | A | | 12/1993 | Fennessy, Sr. |
| 5,800,246 | A | | 9/1998 | Tomioka |
| 5,958,170 | A | * | 9/1999 | Cetrangolo ................. 156/247 |
| 5,980,362 | A | * | 11/1999 | Hensler |
| 6,199,545 | B1 | * | 3/2001 | Adamson |

FOREIGN PATENT DOCUMENTS

| | | | |
|---|---|---|---|
| GB | 2 018 681 | * | 10/1979 |

* cited by examiner

*Primary Examiner*—Curtis Mayes
(74) *Attorney, Agent, or Firm*—Shlesinger, Arkwright & Garvey LLP

(57) ABSTRACT

This invention relates to display devices. More particularly, this invention relates to displays, such as advertisements, formed in substrates, such as concrete. Likewise, this invention relates to a method of making such display devices, including a method of forming a display, such as advertising logo, in concrete.

11 Claims, 3 Drawing Sheets

CONCRETE DISPLAY DEVICE AND METHOD OF MAKING

CROSS REFERENCE TO RELATED APPLICATION

This application claims the priority of application Ser. No. 60/132,166, filed May 3, 1999, and which is incorporated herein by reference.

FIELD OF THE INVENTION

This invention relates to display devices. More particularly, this invention relates to displays, such as advertisements, formed in substrates, such as concrete. Likewise, this invention relates to a method of making such display devices, including a method of forming a display, such as an advertising logo, in concrete.

BACKGROUND OF THE INVENTION

Display devices, such as advertising signs and billboards are known.

It is likewise known to paint logos on sidewalks and the sides of buildings.

However, such known displays all suffer the drawback that they rapidly deteriorate and wear over time, owing to weather, dust, pollution, foot-traffic (in the case of signs painted on sidewalks,) and like deteriorating factors.

Accordingly, there is a need for a display, and a method of making such, which overcomes the drawbacks of such devices.

OBJECTS AND SUMMARY OF THE INVENTION

Accordingly, it is an object of the invention to overcome the drawbacks of the prior art devices.

Another object of the invention is to provide a display device having a longer life than known display devices.

A further object of the invention is to provide a display which may be formed in substrates, such as concrete, yet which does not deteriorate over time.

A further object of the invention is to provide a display which can be formed in a concrete sidewalk, and which does not deteriorate due to foot-traffic, sweeping and maintenance of the sidewalk, and even the use of snow shovels and snow plows on the sidewalk.

Yet another object of the invention is to provide a method of making such display devices which achieves the goals of all the above-identified objects of the invention.

Yet another object of the invention is to provide a method of making a display which uses simple materials, is easy to use, is environmentally friendly, and which yields a long lasting display.

In summary, the invention includes a display device including a substrate, a recessed portion provided in the substrate, a display material. (such as a colorant) provided in the recessed portion, the display material being provided in a sufficient quantity so as to be visible at a predetermined distance from the substrate.

The invention likewise includes a method of making such a display.

The invention further includes a method of making a display comprising the steps of:

Forming a recessed portion in a substrate, providing display material in the recessed portion, the recessed portion being provided in a sufficient quantity so as to visible at a distance from the substrate.

The invention likewise includes a method of making a display device, comprising:

a) providing a substrate;

b) forming a recess in the substrate; and c) providing a display material in the recessed portion, the display material being provided in a sufficient quantity so as to be visible at a predetermined distance from the substrate.

The substrate may include concrete.

The forming of a recessed portion in the substrate may include sandblasting.

A stencil may be provided, the stencil being sufficiently strong so as to withstand the effects of sandblasting for a predetermined period of time, and the stencil being configured to provide a desired portion of the display.

The display material may include a colorant.

The display material may include paint.

A stencil may be provided on the concrete, the stencil defining a portion of the display to be formed, the stencil including an adhesive backing.

The step of sandblasting the concrete may be carried out for a sufficiently long period of time that the aggregate in the concrete is exposed, so as to achieve a three dimensional look.

The method may further include the steps of:

a) peeling off the backing of the stencil, placing the stencil on the area;

b) applying pressure to the stencil with a straight edge and a rubber mallet to ensure proper bonding to the concrete; and c) sandblasting the recessed portion to a depth of about at least ⅛ of an inch.

The method may also include the step of:

a) forming a recessed border with one of a die grinder and a saw equipped with a diamond blade.

The step of forming a recessed border may include laying down a piece of material on the substrate to use as a guide and moving the one of a die grinder and saw along the perimeter of the material to form the recessed border.

The sandblasting may be carried out at about 115–125 p.s.i. and at a fluid flow rate of about 15–20 cfm (cubic feet per minute).

The stencil may include a plurality of stencils; and at least one of the plurality of stencils may have an adhesive backing.

The recessed portion may have a depth of about at least 1⁄16 of an inch.

The recessed portion has a depth of about at least 1⁄16 of an inch.

The inventive method of making a display may likewise include the steps of:

a) providing a concrete substrate;

b) sweeping an area of the concrete substrate prior to placing a stencil in place on the area;

c) providing a stencil on the concrete substrate, the stencil defining a portion of the display to be formed, the stencil including an adhesive backing covering an adhesive side of the stencil;

d) peeling off the backing of the stencil to expose the adhesive side of the stencil, and placing the adhesive side of the stencil on the area;

e) sandblasting a recessed portion in the concrete substrate;

f) coloring the recessed portion;

g) sealing the colored recessed portion;

h) the step of sandblasting the concrete is carried out for a sufficiently long period of time that an aggregate in the concrete is exposed, so as to achieve a three dimensional look; and i) forming a recessed border with one of a die grinder and a saw equipped with a diamond blade.

The step of forming a recessed border may include laying down a piece of material on the substrate to use as a guide and moving the one of a die grinder and a saw along the perimeter of the material to form the recessed border.

The stencil may include a plurality of stencils and at least one of the plurality of stencils may have an adhesive backing.

There is likewise disclosed a display made in accordance with the above method.

DETAILED DESCRIPTION OF THE PREFERRED EMBODIMENT

Figure 1:
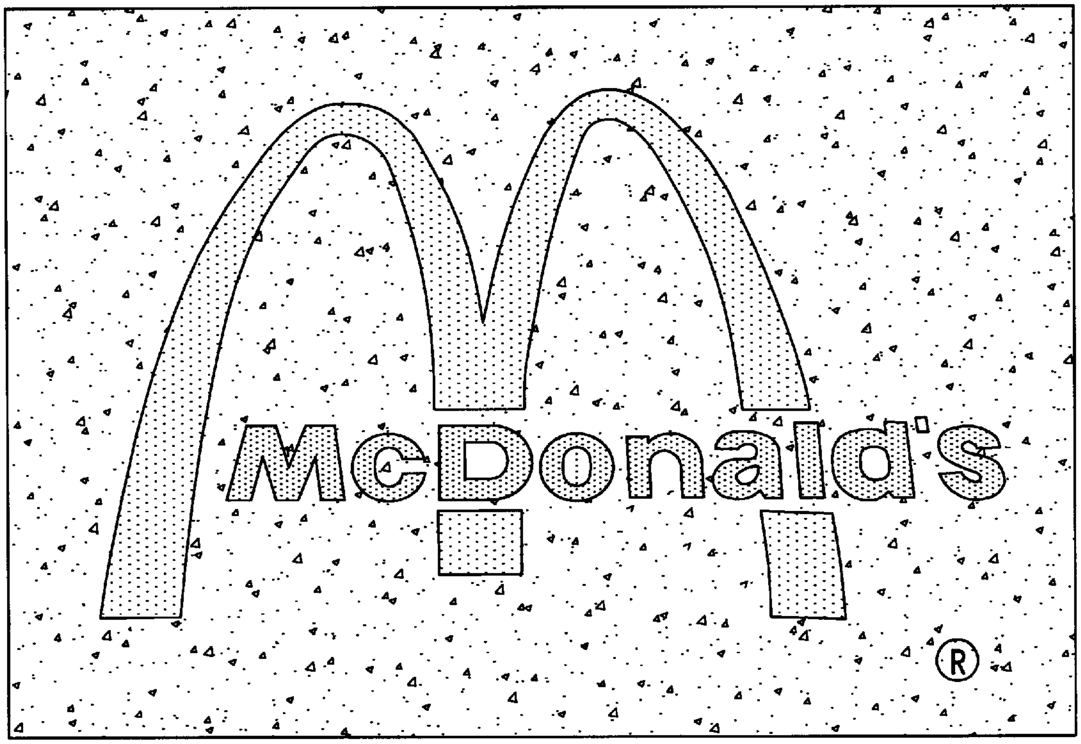
FIG. 1 shows a first example of a display device formed in accordance with the invention, in this case illustrating a McDonald's® logo formed in concrete.
Figure 2:
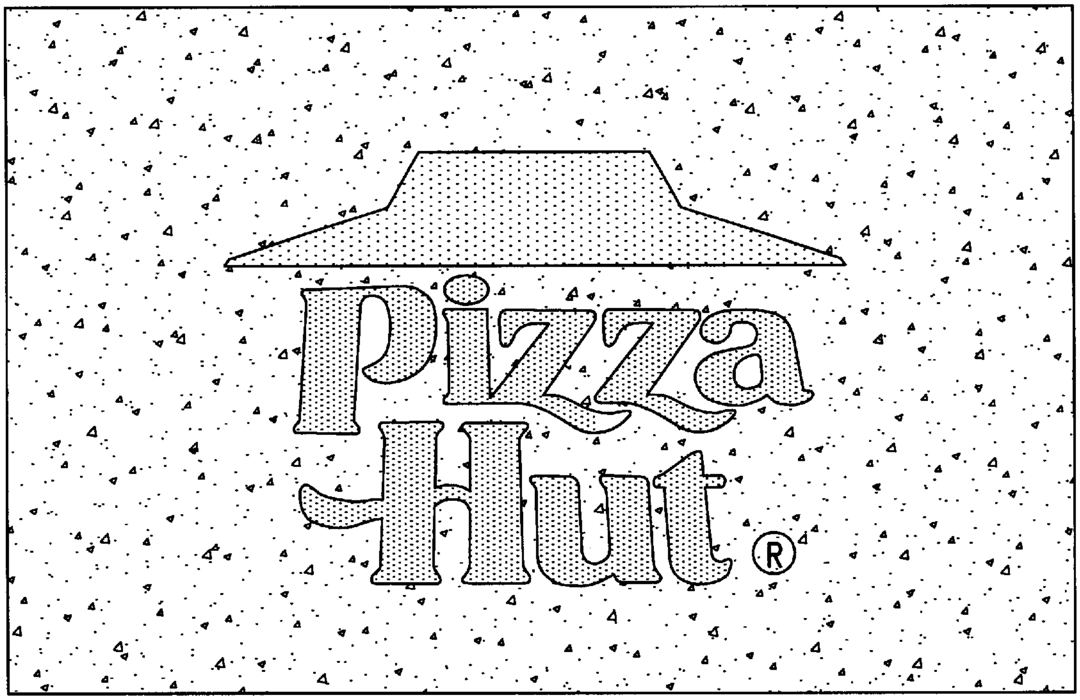
FIG. 2 illustrates a further embodiment of the invention, illustrating a Pizza Hut® logo formed according to the invention.
Figure 3:
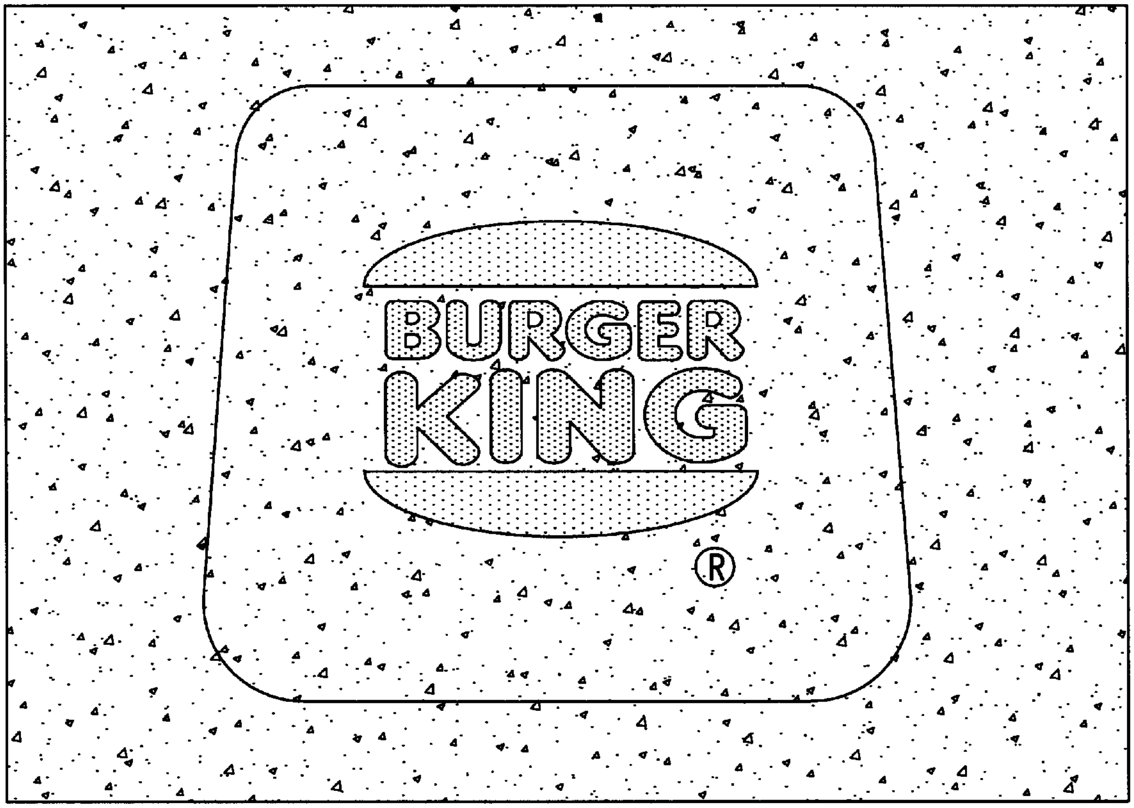
FIG. 3 illustrates a Burger King® logo formed according to the invention, the Burger King® logo having an inventive black border surrounding it in the concrete, to enhance the effects of the display.
Figure 4:
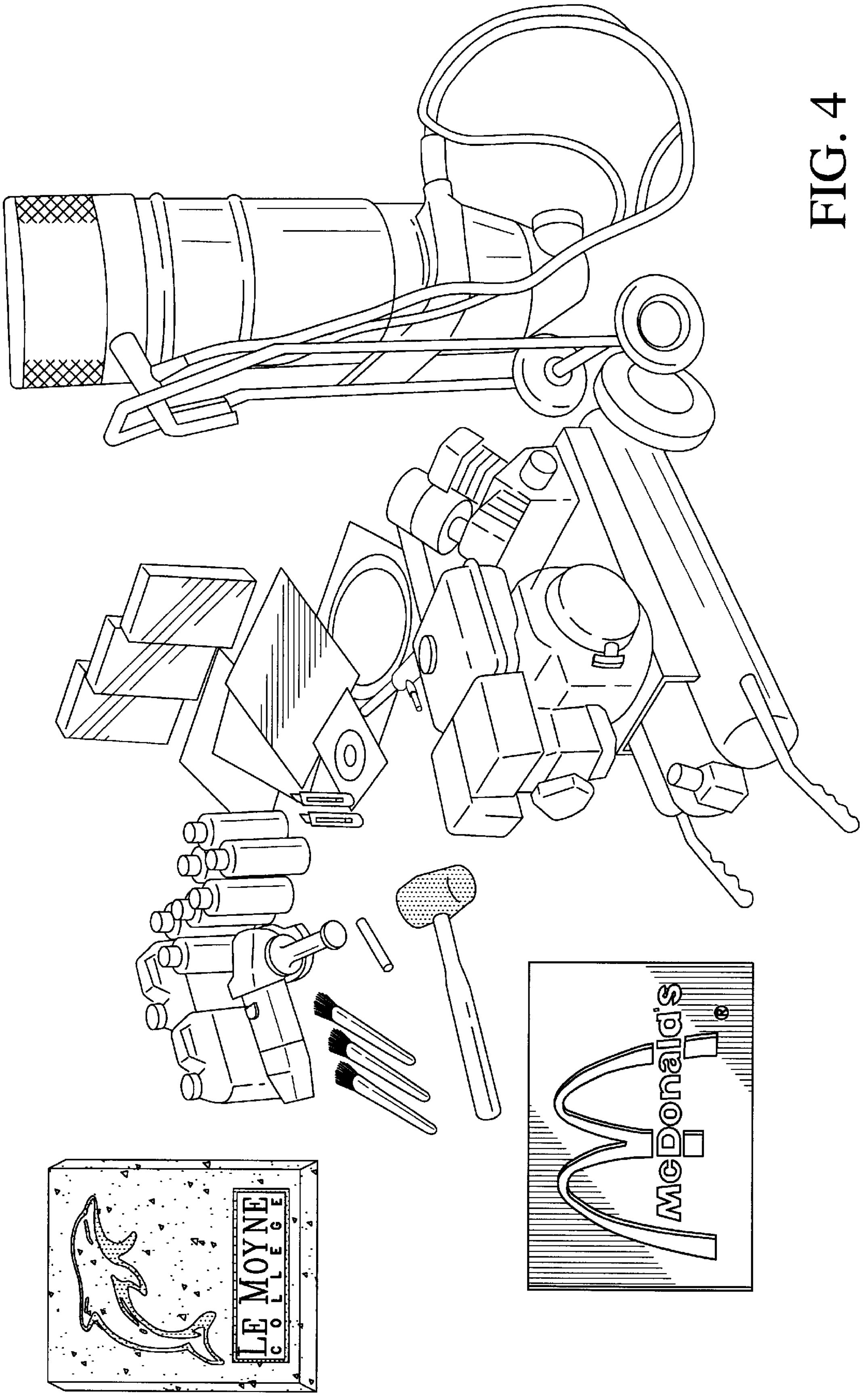
FIG. 4 illustrates the basic set of tools required for performing the invention, such as stencils, colorant, sealers, air filters for the person performing the invention, a portable five(5) gallon recirculating sandblaster, and the inventive stencils.

The invention can be understood by referring to the above objects and summary of the invention, as well as the following steps for making the display.

In the following two(2) pages of discussion, (i.e., pages 5 and 6) the method or system for making the display in the substrate will be called the LogoCrete System for simplicity.

METHOD AND SYSTEM OF MAKING THE CONCRETE DISPLAY DEVICE

Step One: Sweep off the area that the stencil is to be placed. After the area has been swept, remove the adhesive back from the reverse side of the stencil and place adhesive side down in it's final destination, whether it be in front of a door, sidewalk or where ever desired.

Step Two: Once stencil is in proper place, use straight edge smoother and Rubber Mallet to apply pressure to stencil, assuring that the stencil will have a correct bond to the surface. This step is very important for proper adhesion. Once Rubber Mallet has been used to pound stencil, you may remove the top layer of lettering or logo that are later to be sandblasted. You will see a thin plastic film under peeled portion of rubber stencil that will also need to be cut out where you plan on sandblasting for faster completion.

Step Three: Once letters or logos have been separated from rest of stencil, you may begin sandblasting all exposed area to a minimum depth of ⅛". This will require using the recirculating, specially designed sandblaster with a proper air compressor that will enable you to achieve a PSI of 115–125 and a CFM of 15–20

Step Four: After sandblasting is complete, use the appropriate colorant to fill in sandblasted area of stencil. Example: Burger King would have an orange-brown color for Bun and a bright red for the lettering.

Step Five: Seal logos or letters with one or two coats of specialized LogoCrete water-based Sealant. This will give your logos or letters proper protection against Ultra-Violet sun rays. It also has a high resistance rate against abrasion.

While this invention has been described as having a preferred design, it is understood that it is capable of further modifications, and uses and/or adaptations of the invention and following in general the principle of the invention and including such departures from the present disclosure as come within the known or customary practice in the art to which the invention pertains, and as may be applied to the central features hereinbefore set forth, and fall within the scope of the invention or limits of the claims appended hereto.

What is claimed is:

1. A method of making a display, comprising the steps of:

a) providing a concrete substrate;

b) sweeping an area of the concrete substrate prior to placing a stencil in place on the area;

c) providing a stencil on the concrete substrate, the stencil defining a portion of the display to be formed, the stencil including an adhesive backing covering an adhesive side of the stencil;

d) peeling off the backing of the stencil to expose the adhesive side of the stencil, and placing the adhesive side of the stencil on the area;

e) sandblasting a recessed portion in the concrete substrate;

f) coloring the recessed portion;

g) sealing the colored recessed portion;

h) the step of sandblasting the concrete is carried out for a sufficiently long period of time that an aggregate in the concrete is exposed, so as to achieve a three dimensional look; and i) forming a recessed border with one of a die grinder and a saw equipped with a diamond blade.

2. A method as in claim 1, wherein:

a) said step of forming a recessed border includes laying down a piece of material on the substrate to use as a guide; and b) moving the one of a die grinder and a saw along the perimeter of the material to form the recessed border.

3. A method as in claim 1, wherein:

a) the stencil includes a plurality of stencils; and b) at least one of the plurality of stencils has an adhesive backing.

4. A method as in claim 1, wherein:

a) said stencil is sufficiently strong so as to withstand the effects of sandblasting for a predetermined period of time, and said stencil is configured to provide a desired portion of the display.

5. A method of making a display, comprising the steps of:

a) providing a substrate, the substrate including concrete;

b) sweeping an area of the concrete prior to placing a stencil in place on the area, and prior to sandblasting;

c) providing a stencil on the concrete, the stencil defining a portion of the display to be formed, the stencil including an adhesive backing;

d) peeling off the backing of the stencil, placing the stencil on the area;

e) applying pressure to the stencil with a straight edge and a rubber mallet to ensure proper bonding to the concrete;

f) forming a recessed portion in the substrate by sandblasting the concrete to a depth of about at least 1/16 of an inch, the sandblasting of the concrete carried out for a sufficiently long period of time that the aggregate in the concrete is exposed, so as to achieve a three dimensional look;

g) coloring the recessed portion;

h) sealing the colored recessed portion; and i) forming a recessed border with one of a die grinder and a saw equipped with a diamond blade.

6. A method as in claim 5, wherein:

a) said step of forming a recessed border includes laying down a piece of material on the substrate to use as a guide; and b) moving the one of a die grinder and saw along the perimeter of the material to form the recessed border.

7. A method as in claim 5, wherein:

a) the sandblasting is carried out at about 115–125 p.s.i. and at a fluid flow rate of about 15–20 cfm (cubic feet per minute).

8. A method as in claim 5, wherein:

a) the stencil includes a plurality of stencils; and b) at least one of the plurality of stencils has an adhesive backing.

9. A method as in claim 5, wherein:

a) the recessed portion has a depth of about at least 1/8 of an inch.

10. A method as in claim 5, wherein:

a) the coloring of the recessed portion is performed with paint.

11. A method as in claim 5, wherein:

a) said stencil is sufficiently strong so as to withstand the effects of sandblasting for a predetermined period of time, and said stencil is configured to provide a desired portion of the display.

* * * * *